Dec. 18, 1934.  J. CODER  1,984,918
COUPLING
Filed Sept. 10, 1932  6 Sheets-Sheet 1

Inventor:
Joseph Coder
per S. Sokal.
Attorney.

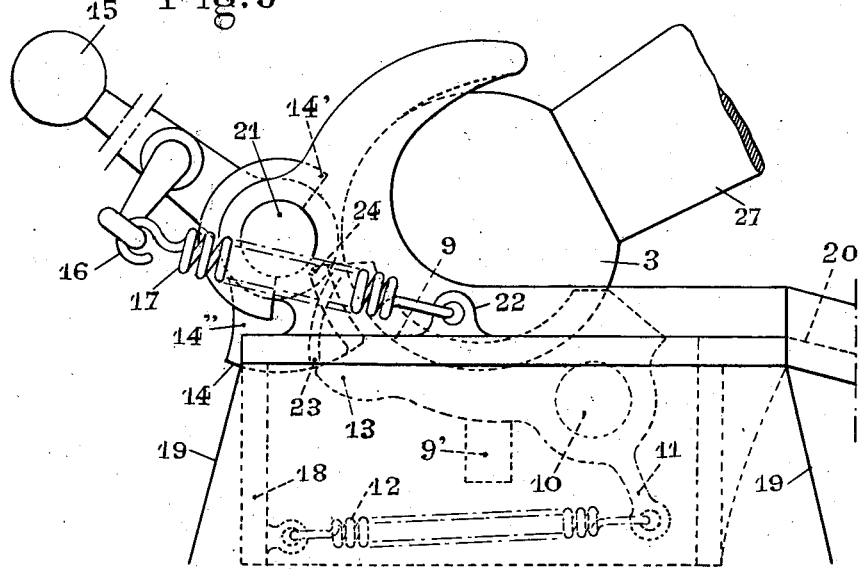
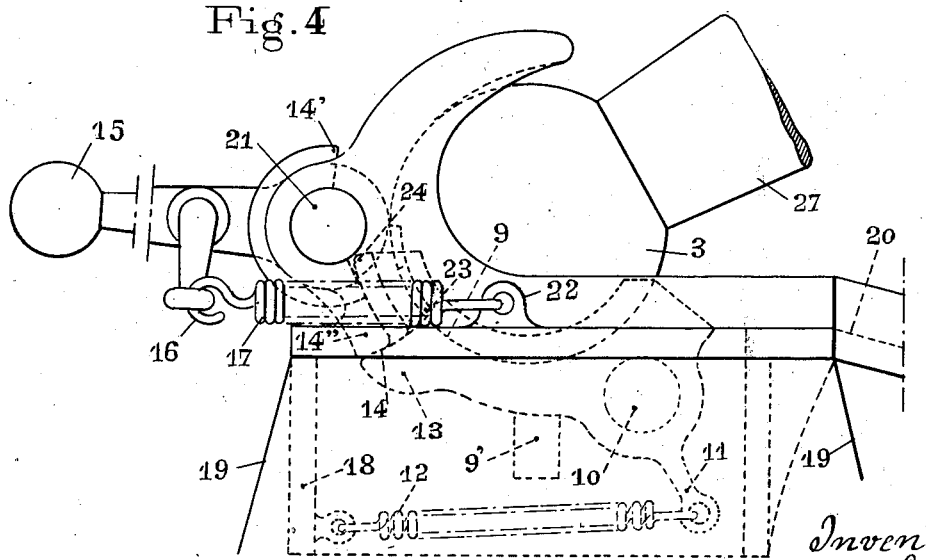

Dec. 18, 1934.  J. CODER  1,984,918
COUPLING
Filed Sept. 10, 1932  6 Sheets-Sheet 3

Inventor
Joseph Coder
per S. Sokal,
Attorney.

Dec. 18, 1934.   J. CODER   1,984,918
COUPLING
Filed Sept. 10, 1932    6 Sheets-Sheet 4

Inventor:
Joseph Coder
per S. Sokal,
Attorney.

Dec. 18, 1934.  J. CODER  1,984,918
COUPLING
Filed Sept. 10, 1932   6 Sheets-Sheet 5
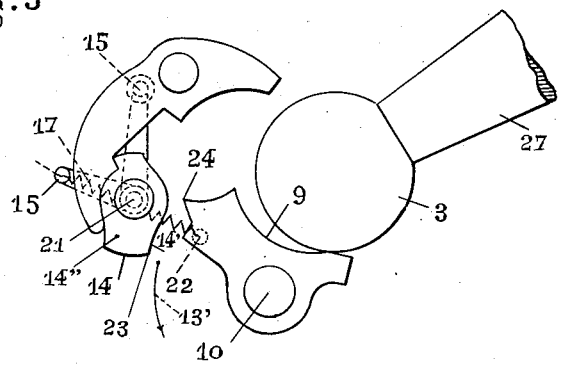
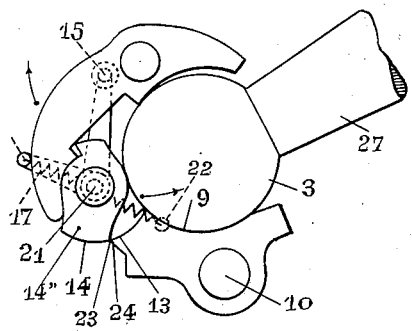
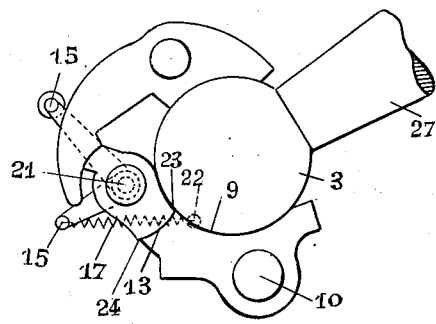
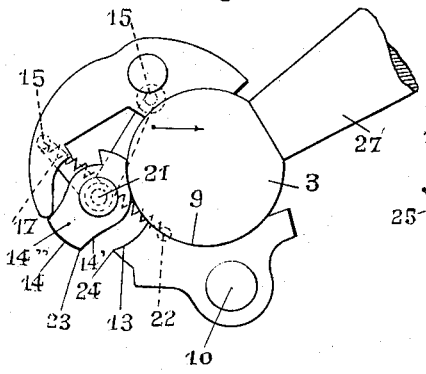
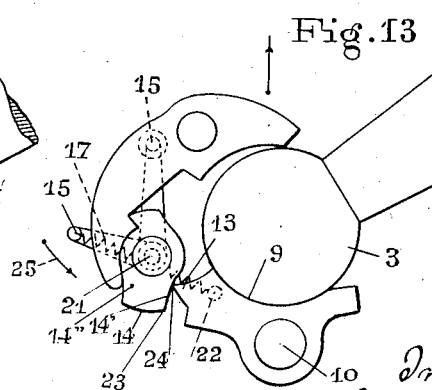
Inventor:
Joseph Coder
per S. Sokal
Attorney Dec. 18, 1934.   J. CODER   1,984,918
COUPLING
Filed Sept. 10, 1932    6 Sheets-Sheet 6

Inventor:
Joseph Coder
per S. Sokal,
Attorney.

Patented Dec. 18, 1934

1,984,918

UNITED STATES PATENT OFFICE 1,984,918

COUPLING

Joseph Coder, Marseille, France

Application September 10, 1932, Serial No. 632,611
In France November 21, 1931

5 Claims. (Cl. 280—33.15)

Applications have been filed in France on November 21 and 30, 1931 and February 23, 1932 and in Great Britain on June 25, 1932.

The present invention relates to ball and socket couplings, more particularly tractor-trailer couplings of the automatic type wherein the socket member comprises two or more relatively movable parts so arranged that they open automatically to admit the ball member and are subsequently closed and locked in position.

It is known in connection with ball and socket members of this type to provide the vehicle carrying the socket of the coupling with a guide surface which facilitates the entry of the ball head into the socket, and the bottom of the cavity of the socket is in such constructions at a lower level than the top edge of the guide surface.

In the known ball and socket couplings of the above type the ball head is carried in the closed condition of the coupling by a vertically disposed rod or stem member, and is engaged by the socket on both sides of the longitudinal axis of said member and usually also at the base. According to the invention the stem or arm carrying the ball head is not vertically disposed in the closed condition of the coupling, but is inclined at a very considerable angle to the vertical, being in fact preferably arranged nearer to the horizontal than to the vertical position. The advantage of this arrangement is that the tractive force is transmitted from the tractor to the trailer in a more satisfactory manner and that fracture of the ball head is less likely to occur during the coupling and normal operation.

The invention also consists in subsidiary features, substantially as set forth in the particular description and in the appended claims.

The accompanying drawings show, by way of example two constructions of the improved coupling.

Fig. 3 shows the parts in the position which they assume at the moment in which the movable sector of the socket is in the closing position and the locking device is ready to lock the movable sector in the closing position.

Fig. 4 shows the sector locked by the locking device, the coupling being now completely closed and locked.

Figs. 9 to 13 show diagrammatically a modified construction of the coupling.

Fig. 9 shows the parts in the open position ready for the entry of the ball-shaped head into the spherical socket.

Fig. 10 shows the parts in the position immediately preceding the automatic closing of the coupling.

Fig. 11 shows the coupling closed and locked in the operative position.

Fig. 12 shows the coupling still closed, but the locking device opened for the purpose of releasing the coupling.

Fig. 13 shows the coupling released, but with the ball-shaped head still within the movable sector.

Figure 1:
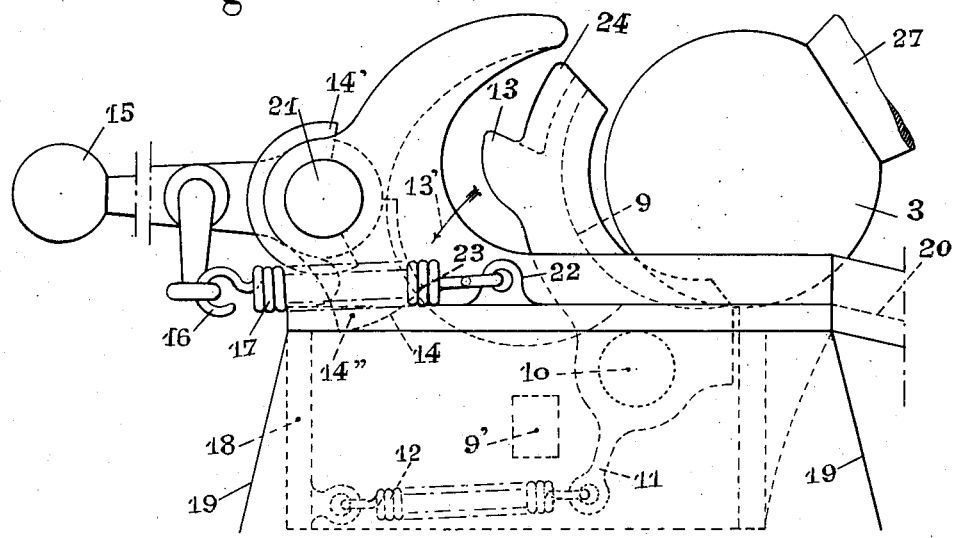
Fig. 1 is an elevation of the first construction of the coupling in which the socket and the movable sector thereof, as well as the locking device, are shown in the open position ready for effecting the coupling.
Figure 2:
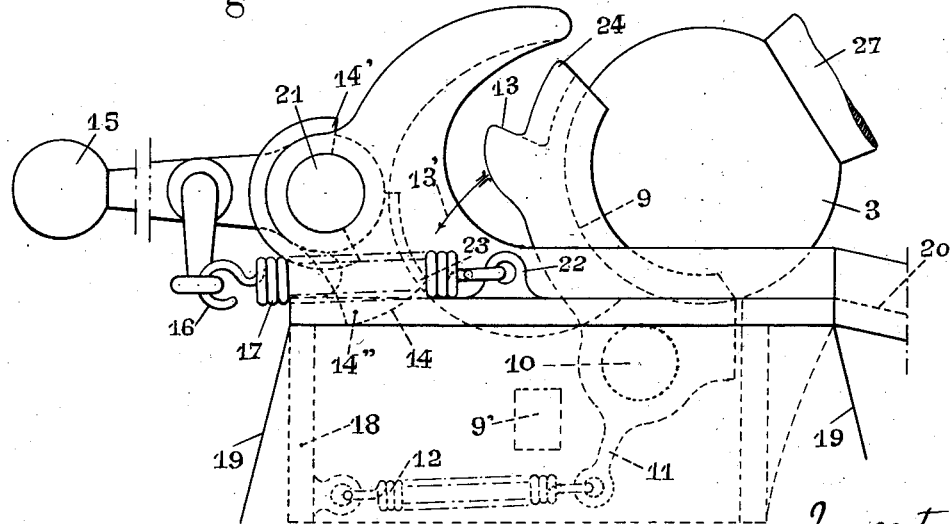
Fig. 2 shows the parts of the coupling in the position which they assume when the draw-head begins to depress the movable sector of the socket at the commencement of the automatic coupling operation.
Figure 5:
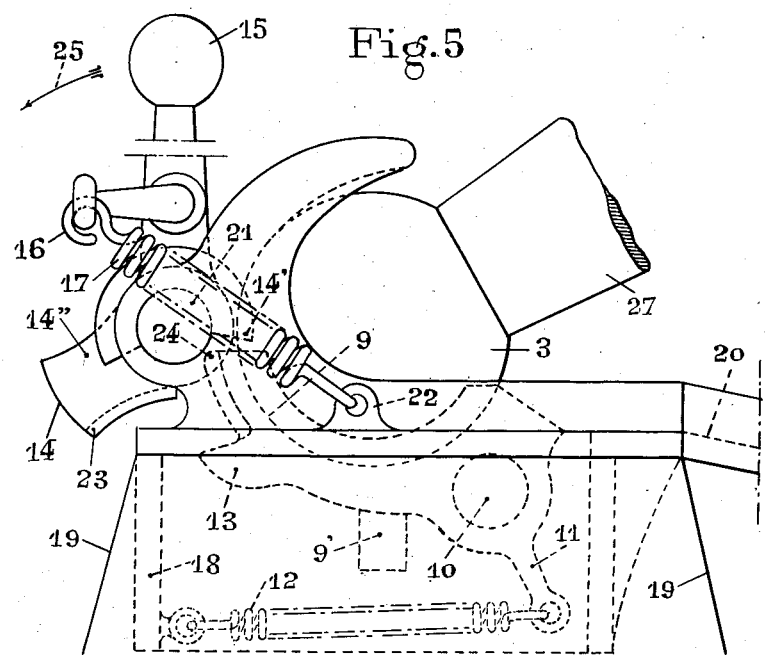
Fig. 5 shows the parts in the position into which they are brought just before the release of the coupling.
Figure 6:
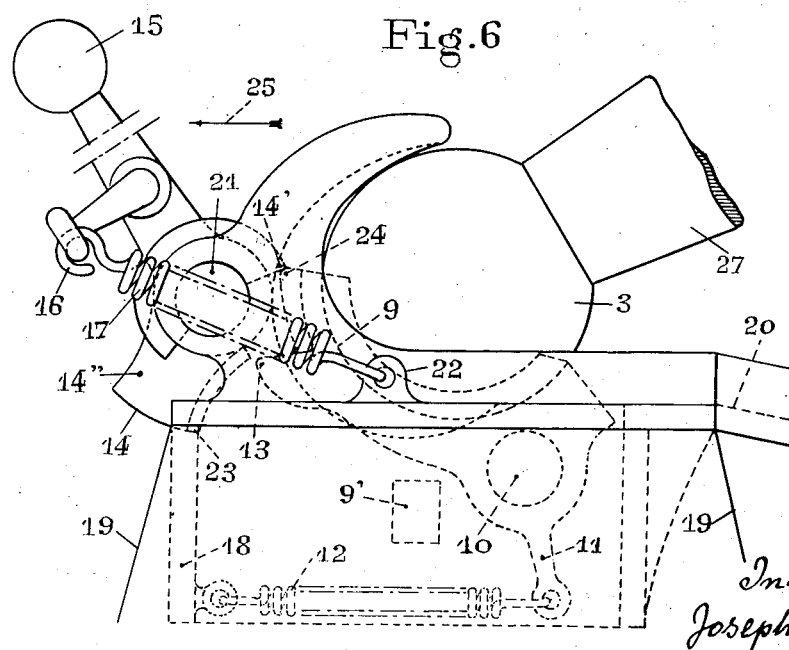
Fig. 6 shows the parts in the position in which the head is being drawn out of the socket.
Figure 7:
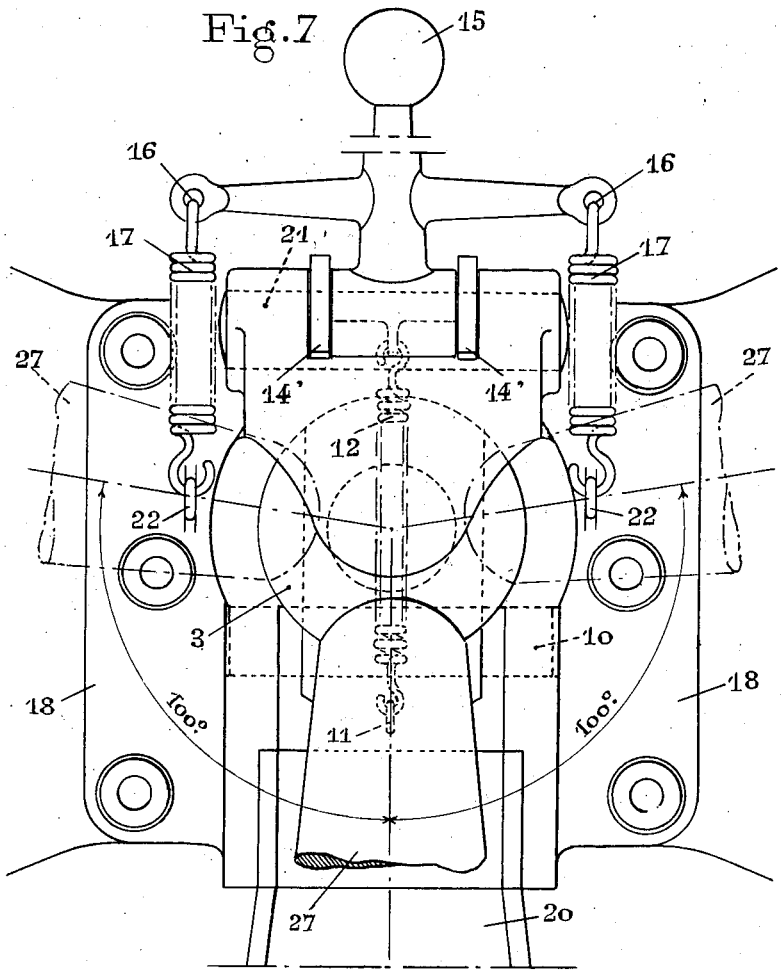
Fig. 7 is a plan of the coupling shown in the previous figures.

Referring first to Figs. 1 to 7, it will be seen that the coupling comprises a spherical socket having the same radius as the ball-shaped draw head 3. The socket comprises a lower central sector shaped section 9 which is adapted to turn about a pivot 10. The sector 9 is formed with an arm 11 upon which acts a return spring 12 fixed at the other end to the frame. The sector has a projection 13 adapted to co-operate with a projection 14 of a locking member 14″, the latter being provided with a handle 15 and with two return springs 17, the ends 16 of these return springs acting upon two lateral arms of the handle 15 (see Fig. 7), and the other ends of the return springs being fixed to the frame at 22.

The lower part of the cavity of the socket upon which the ball head 3 rests in its operative position, is arranged at a slightly lower level than the surface which guides the ball-shaped draw head into engagement with the socket, this difference in the level of the guide surface and the lower end of the socket increasing the safety of operation of the coupling. The socket is integral with or fixed to a casing 18 by means of which it is held in the frame of the tractor. A guide member 20 which may have a semi-cylindrical shape at its end adjacent to the socket of a radius slightly larger than the ball-shaped head 3, serves for facilitating the entry of the head into the socket as well as the removal of the head from the socket during the coupling and uncoupling operations.

The coupling operation takes place in the following manner. The trailer stands still and the tractor is backed into the trailer in such manner that the draw-head 3 enters the guide member 20 (Fig. 1). During the further backing movement of the tractor the head 3 (Figs. 2 and 9) comes into contact with the movable sector 9 of the socket and causes the latter to turn about its pivot 10. During this movement in the direction of arrow 13', the projection 13 strikes the projection 14 of the locking member 14" and causes the locking member 14" to turn about its pivot 21, thereby tensioning the return spring 17. It will be seen that this return spring 17 is so arranged relatively to its point of attachment 22 that it can be used for holding the locking device and the handle 15 thereof both in the position which it assumes whilst locking the head 3 and that which it assumes for unlocking the head 3, these positions being shown in Figs. 1 and 5.

During the further backing movement of the tractor (Figs. 3 and 10), the extreme edge of the projection 13 reaches the extreme edge of the projection 14 at the point 23 and immediately afterwards the projection 13 clears the projection 14. At this moment, the springs 17 rapidly act upon the locking member 14" and move the projection 14 so as to lock the sector 9 in the closing position. It will be seen from Fig. 4 that the bearing surfaces of the projections 13 and 14 in the locking position are very large, being of the same curvature. The sector 9 is now locked and the coupling has been automatically closed by the turning of the sector 9 about the pivot 10 and by the turning of the locking member about its pivot 21, this position being shown in Figs. 4 and 11.

It may be pointed out that in this position the socket sector 9 bears firmly against a stationary abutment 9' owing to the load acting upon the sector. Owing to the resistance which the tractor has to overcome the head 3 bears against the rear portion of the sector 9 and consequently the latter has the tendency to turn upwards about its pivot 10. This causes the sector to bear with increased pressure against the locking member 14" against which it abuts. It will be seen that consequently the higher the resistance offered to the traction, the more effective will be the locking action and also the action by which the head is held within the socket. It will thus be seen that an accidental opening or release of the coupling is quite impossible as such a release could take place only if the locking projection 14 of the locking member 14" did not exist. The improved coupling device provides locking surfaces of such size that fracture of the locking parts and accidental release of the coupling are entirely out of the question.

With the parts in the closed and locked position, it will be seen that the coupling provides a universal joint of very considerable amplitude in all the required directions. A tractor and trailer connected by this coupling may turn, relatively to each other through an angle up to 100° on either side of the longitudinal axis (see Fig. 7).

The operation of releasing the coupling takes place as follows:—

Figure 8:
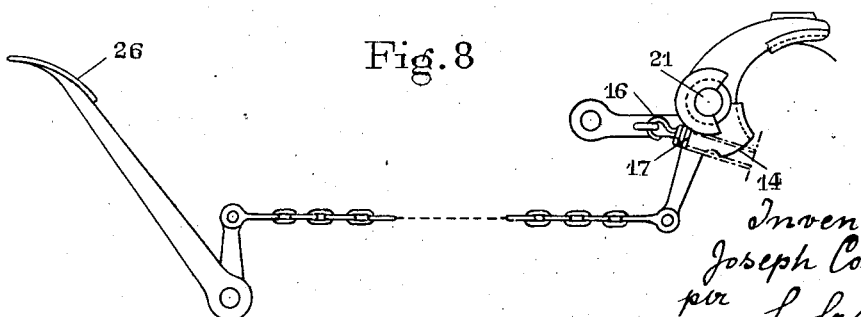
Fig. 8 shows diagrammatically an arrangement for the release of the coupling adapted to be actuated from the driver's seat.
Figure 14:
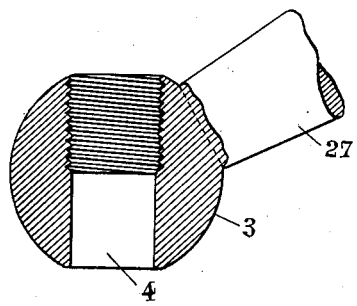
Fig. 14 is a sectional elevation of the ball-shaped draw-head without an internal plug constituting the exchangeable and adjustable wearing member.

The trailer stands still. The handle 15 is raised by hand, or in the case of the auxiliary device shown in Fig. 8, by a pedal 26, into the position shown in Figs. 5 and 12. In this position of the handle 15 the stop 14 of the locking member 14' is removed from the stop 13 of the sector 9. The springs 17 hold the handle 15 in this vertical position. The parts being provisionally set in this manner, the tractor moves forward, that is away from the trailer and the head 3 of the coupling causes the socket sector 9 to rise by turning about its pivot 10 (see Figs. 6 and 13). During this movement, an edge 24 of the sector 9 encounters a projection 14' of the locking member and lifts said projection, whereby the handle 15 is moved to the left in the direction of the arrow 25. The angle through which the handle is moved is so calculated that the springs 17 are brought into such a position as to complete the return movement of the handle 15 into the position shown in Figs. 1 and 9. It will be understood that the springs 17 begin to act immediately after the edge 24 has cleared the projection 14. At this moment the head 3 is at the level of the guide member 20 and the release takes place very readily.

At the end of this operation all the movable parts of the coupling upon the tractor are ready for effecting a fresh coupling, the latter being as previously described carried out quite automatically by the relative movement of tractor and trailer.

Figure 15:
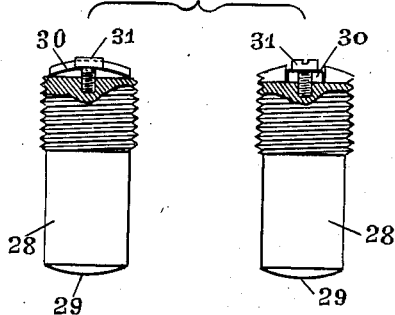
Fig. 15 shows in sectional elevation and side view an internal plug which constitutes the adjustable and exchangeable wearing member of the head.
Figure 16:
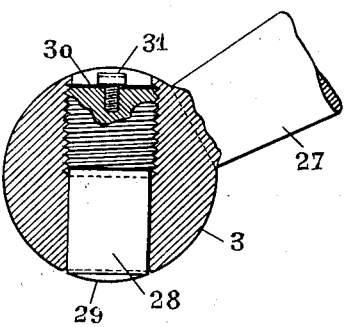
Fig. 16 shows in sectional elevation the complete head with the internal plug forming the adjustable and exchangeable wearing member.

The spherical head 3 is carried by an arm 27 which is fixed to the trailer. The spherical head is provided with a vertical bore for the reception of a plug 28 (Fig. 15), the smooth lower portion of which is rounded at 29, the radius of curvature of the rounded portion being the same as that of the ball 3. The plug 28 is held in the ball 3 by screw threads and is secured against rotation by a steel blade 30 the ends of which enter under the action of a setscrew 31 into the internal screw threads of the bore within the head 3. The blade 30 therefore prevents by friction turning of the plug 28 and also vertical movement thereof. It will be understood that the object of the plug 28 is to provide an adjustable and exchangeable wearing surface 29 which practically carries the whole load and is therefore subject to more rapid wear than the other bearing surfaces of the ball 3. It will be understood that when the bearing surface 29 has slightly worn away, the clamping screw 31 is loosened and the plug 28 is screwed further home for the purpose of adjusting the wearing surface 29 and bring same again into contact with the socket.

Figure 17:
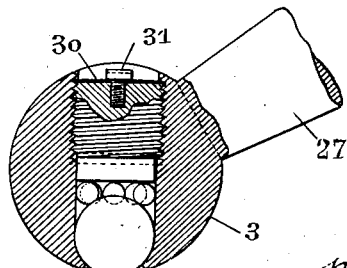
Fig. 17 shows in sectional elevation a modified construction in which a ball bearing is associated with the internal plug.

Fig. 17 shows a slightly modified construction in which a ball bearing is interposed between the adjustable plug and the socket. This ball bearing consists of a large ball resting upon a row of small balls.

It has been found in actual practice that owing to the frequent operations of coupling and uncoupling, a somewhat rapid and localized wear takes place at the point of contact of the ball head 3 with the guide surface which is provided for facilitating the entry of the ball head into the socket. The frequent rubbing of the ball head against the guide surface leads to a flattening at the bottom of the ball, and consequently the ball surface becomes inactive at the most important point at which the load is taken. As it is impossible to grind the ball in order to restore its spherical shape, it is necessary with ordinary ball heads to replace entirely the ball head after a short time. This drawback is, according to the invention avoided by the provision of the plug 28 which by its adjustability within the bore 4 enables rapid wear to be quickly compensated for. If necessary the rounded portion 29 of the plug may, of course, be re-shaped should it wear away in an irregular manner, for instance, if it should become flat. Even if it should be necessary to replace the whole plug, the cost of replacement is much smaller than in the case of ordinary ball heads.

It may be pointed out that as the plug 28 is of ordinary shape, it may be made of any suitable, for instance, very hard, metal and it may be afterwards further treated with a view to increasing its hardness and thus reduce its wear to a minimum.

The improved coupling forming the subject of the invention may be used for various kinds of tractors and trailers and is adapted to various kinds of vehicles owing to the very small number of constituent parts. An important advantage of the coupling is that it gives complete freedom of movement of the two coupled vehicles relatively to each other within very wide angles both horizontally and vertically.

It will be understood that various changes in detail may be made without departing from the scope of the invention.

I claim:

1. A coupling of the ball and socket type, comprising in combination: a ball head; a socket having a pivoted movable portion which is adapted to permit in its open position of the entry of the ball head into the socket and serves in its closed position for holding the ball head in the socket; automatic means for locking the movable socket portion in the closed position, said movable socket portion and said ball head being so arranged relatively to each other that the movable socket portion is moved by the ball head from the open into the closed position during the entry of the ball head into the socket, and is also moved from the closed position into the open position during the removal of the ball head from the socket; a guide surface for facilitating the entry of the ball head into and the removal of the ball head from the socket, said guide surface having a top edge adjacent to the socket arranged at a higher level than the bottom of the cavity of the socket; spring means acting upon the movable socket portion to hold same in contact with the ball head; said automatic means for locking the movable socket portion comprising in combination: a catch; spring means adapted to hold the catch both in the locking and in the inoperative position, and manual means for setting the spring catch from the locking position into the inoperative position prior to the release of the coupling, and means upon the movable socket portion for moving the spring catch from the inoperative position towards the operative position during the movement of the movable socket portion from the closed into the open position, substantially as described.

2. A coupling for vehicles of the ball and socket type comprising in combination: a ball head carried by an inclined arm; a socket arranged substantially symmetrically to the longitudinal axis of said inclined arm, said socket having a pivoted movable portion to enable the ball head to enter the socket; and automatic means for locking the movable socket portion in the closing position, said locking means consisting of a catch which is actuated by one spring in two opposite directions and is moved by that spring both into the locking position and into a completely inoperative position, the initial movement of the catch from the locking position towards the inoperative position being effected by the operator, substantially as described.

3. A coupling for vehicles of the ball and socket type comprising in combination: a ball head carried by an inclined arm; a socket arranged substantially symmetrically to the longitudinal axis of said inclined arm and provided with a pivoted movable portion which in the open position permits the ball head to enter the socket and in the closed position holds the ball head in the socket; a guide surface for guiding the ball head into the socket; and automatic means for locking the movable socket portion in the holding position, said locking means consisting of a catch which is actuated by one spring in two opposite directions and is moved by that spring both into the locking position and into a completely inoperative position, the initial movement of the catch from the locking position towards the inoperative position being effected by the operator, substantially as described.

4. A coupling for vehicles of the ball and socket type comprising in combination: a ball head carried by an inclined arm; a socket arranged substantially symmetrically to the longitudinal axis of said inclined arm and provided with a pivoted movable portion which in the open position permits of the entry of the ball head into the socket and in the closed position holds the ball head in the socket; automatic means for locking the movable part of the socket in the closed position said automatic means comprising a spring catch; operator-controlled means for setting said spring catch; spring means for holding said spring catch in the locking position and also for holding said spring catch in the set inoperative position; and means on the movable socket portion for moving the spring catch part of the way from the inoperative position towards the operative position, substantially as described.

5. A coupling for vehicles of the ball and socket type comprising in combination: a ball head carried by an arm inclined at an acute angle to the horizontal; a socket arranged substantially symmetrically to the longitudinal axis of said inclined arm and having a pivoted movable portion which in the open position permits of the entry of the ball head into the socket and in the closed position holds the ball head in the sockets; automatic means for locking the pivoted movable socket portion in the closed position; and a stop located vertically below the centre of the socket, which holds the movable socket portion in the closed position, said stop serving also to receive the load, substantially as described.

JOSEPH CODER.